Dec. 20, 1927.
H. P. MACK
SECURING MEANS FOR PNEUMATIC TIRES
Filed Feb. 15, 1926
1,653,054
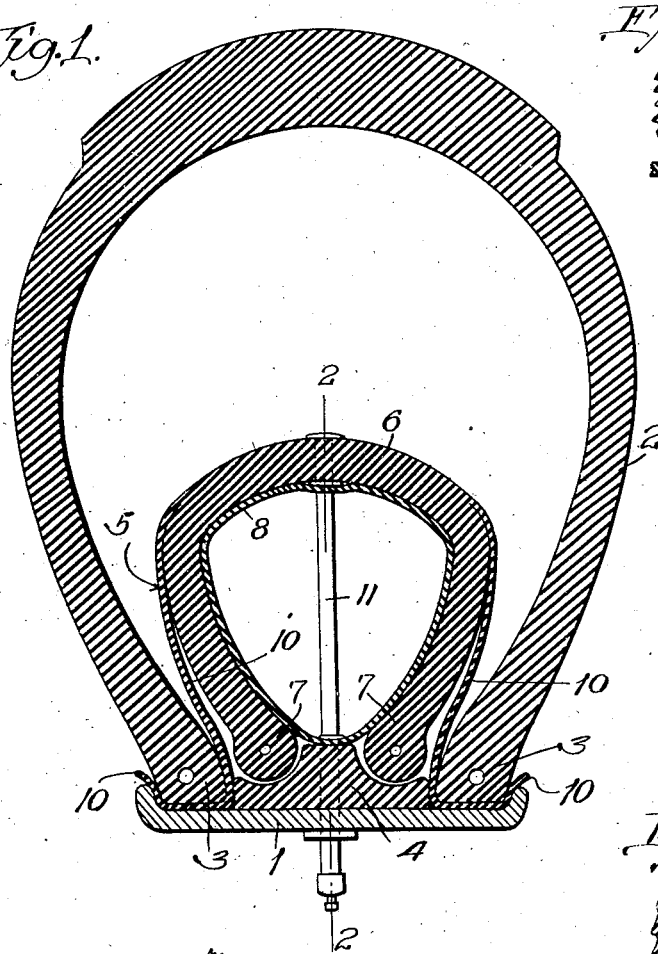
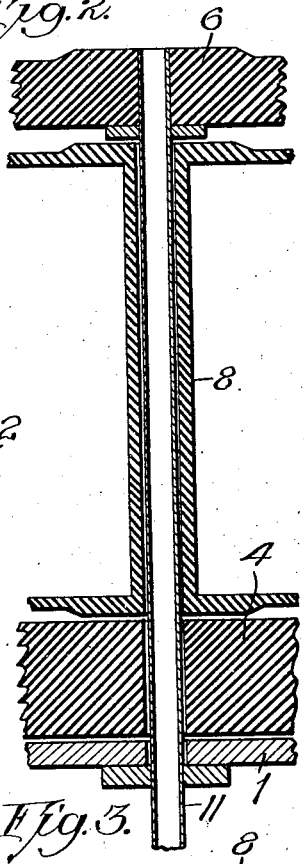
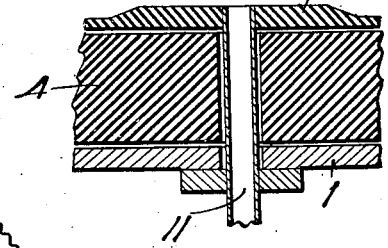
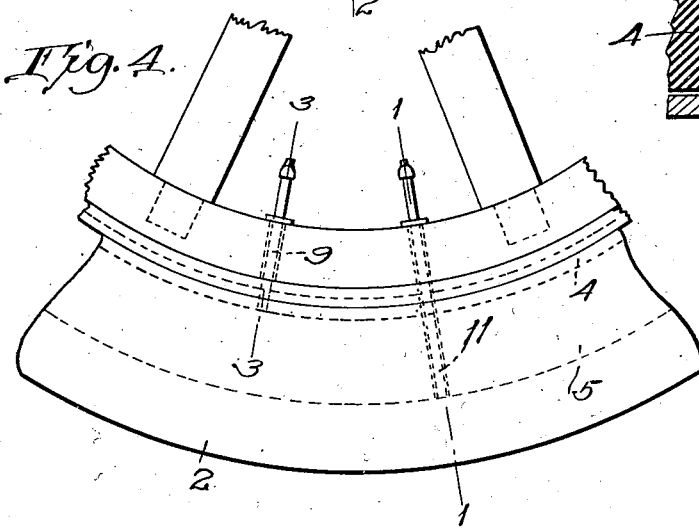
Inventor:
Hans P. Mack
by
Murray O. Hayes
Atty.

Patented Dec. 20, 1927.

1,653,054

UNITED STATES PATENT OFFICE.

HANS P. MACK, OF SALT LAKE CITY, UTAH.

SECURING MEANS FOR PNEUMATIC TIRES.

Application filed February 15, 1926. Serial No. 88,351.

This invention relates to a device to secure ordinary pneumatic tire casings upon the rim in such a manner as to form an air tight enclosure without employing the usual inner tube, and has for its objects:

First: To obviate the use of the ordinary inner tube in a pneumatic tire.

Second: To provide a means for securing a tire casing in such manner as to form an air tight seal between the said casing and rim.

Third: To devise a securing means of the kind specified which will be cheap to manufacture and efficient and durable in use.

In the drawings:

Fig. 1 is a cross sectional view substantially on the line 1—1 on Figure 4, showing the relationships existing among the parts of my device when in operative position upon the rim;

Fig. 2 is an enlarged sectional view taken on the line 2—2 of Fig. 1;

Fig. 3 is a sectional view along the line 3—3 of Figure 4;

Fig. 4 is a diagrammatic side elevational view of a portion of a tire employing my invention, to disclose the relative positions of the two valves.

The numeral 1 designates a conventional "straight side" rim whereon is mounted a casing 2 of the usual type, but without the customary inner tube.

Lying upon rim 1, between beads 3 of casing 2 lies a soft rubber element 4 which may be either in the form of an annulus or a strip having bevelled ends to overlap and form a tight joint.

Seated upon element 4 is the high pressure sealing casing 5, having an outer peripheral portion 6 and bead members 7; within 5 is an inner tube 8 which is inflated by means of a valve 9 of the usual type. From each side of 5 there extends a flap member 10, preferably of some soft material, such as inner tube rubber, which may be integral with a ply of the peripheral portion 6 of casing 5 or may be separate and individually vulcanized to said casing; they may also be secured to 5 up to a line on each side of said casing nearer the beads 7 than shown in Fig. 1. Each flap 10 is passed around a bead 3 of casing 2, lying between said bead and rim 1.

Casing 5 is constructed to carry 125 pounds of air pressure per square inch under normal operating conditions. Under this pressure the beads 7 will be forced very tightly radially inwardly and laterally outwardly against the edges of strip 4, which being of soft rubber will be squeezed tightly against flaps 10 and thus bind said flaps against beads 3 with an air-tight contact; the sides of casing 5 adjacent the beads 7 thereof will also be forced outwardly and thus increase the area of contact between flaps 10 and the casing 2.

A valve having a tube 11 long enough to extend completely through casing 5 and discharge air into casing 2 is provided to inflate the latter casing to any desired pressure; when said latter casing is filled with air to the proper degree the beads 3 will be more vigorously forced against rim 1 with a consequent additional tightness of seal.

It is to be understood that the figures of the drawing are purely diagrammatic and explanatory and are not to be interpreted as narrowing the scope of this invention beyond that defined in the appended claims.

It is thus apparent that I have invented a device which fully achieves the objects set forth above. A car equipped with tires made according to this present disclosure has traveled almost two thousand miles over desert and mountain roads, and these tires have given no trouble whatsoever and have been perfectly satisfactory in every respect.

The invention for which Letters Patent are hereby sought has proved a success under the hardest kind of practical usage.

I claim:

1. A means for securing a pneumatic tire casing upon the rim, comprising a readily distortable element and fluid-pressure actuated means to distort said element.

2. In a means for securing a pneumatic tire casing upon a rim, a high fluid-pressure retaining element, and a flexible and compressible member on each side of said element and in part secured thereto.

3. In combination, a readily distortable element disposed on the rim of a pneumatic tire, and a tube adapted to contain air at high pressure disposed about and distorting said element and causing said element to form an air tight seal.

4. In combination, a pneumatic tire cassing, a soft element disposed between the beads of said casing, an inflatable air tube disposed around said elements, and a flap member secured to each side of said air tube and passed around the beads of said pneumatic tire casing.

5. In combination, a pneumatic tire casing, a soft member disposed between the beads of said casing, an inflatable member disposed about said soft member and within said casing, flaps secured to said inflatable member and passed about the beads of said casing, a valve to introduce air into said inflatable member, and another valve to introduce air into the said casing but outside of said inflatable member.

In witness whereof, I have hereunto affixed my signature.

HANS P. MACK.